United States Patent
Doerksen et al.

(10) Patent No.: US 7,249,067 B2
(45) Date of Patent: Jul. 24, 2007

(54) SYSTEM AND METHOD FOR CREATING CUSTOMIZED CATALOGUES

(75) Inventors: Lee Doerksen, Winnipeg (CA); Sidney L. Bursten, Baltimore, MD (US)

(73) Assignee: VPI Color, LLC, Baltimore, MD (US)

( * ) Notice: Subject to any disclaimer, the term of this patent is extended or adjusted under 35 U.S.C. 154(b) by 611 days.

(21) Appl. No.: 10/625,999

(22) Filed: Jul. 24, 2003

(65) Prior Publication Data

US 2004/0133542 A1    Jul. 8, 2004

Related U.S. Application Data

(60) Provisional application No. 60/415,984, filed on Oct. 4, 2002.

(51) Int. Cl.
*G06F 17/30* (2006.01)
*G07F 7/00* (2006.01)

(52) U.S. Cl. .............................. 705/27; 705/1; 705/14; 705/26; 707/1

(58) Field of Classification Search ................. 705/26, 705/27; 707/10
See application file for complete search history.

(56) References Cited

U.S. PATENT DOCUMENTS

| | | | |
|---|---|---|---|
| 6,125,388 A | 9/2000 | Reisman | |
| 6,128,600 A | 10/2000 | Imamura et al. | |
| 6,167,382 A | 12/2000 | Sparks et al. | |
| 6,216,129 B1 | 4/2001 | Eldering | |
| 6,298,348 B1 | 10/2001 | Eldering | |
| 6,353,831 B1 | 3/2002 | Gustman | |
| 6,360,216 B1 | 3/2002 | Hennessey et al. | |
| 6,377,963 B1 * | 4/2002 | Walker et al. | 715/530 |
| 6,460,020 B1 | 10/2002 | Pool et al. | |
| 6,460,036 B1 | 10/2002 | Herz | |
| 6,549,935 B1 | 4/2003 | Lapstun et al. | |
| 6,978,273 B1 * | 12/2005 | Bonneau et al. | 707/102 |
| 7,103,605 B1 * | 9/2006 | Hazi et al. | 707/102 |
| 2001/0004733 A1 | 6/2001 | Eldering | |
| 2002/0082953 A1 * | 6/2002 | Batham et al. | 705/27 |
| 2002/0087573 A1 | 7/2002 | Reuning et al. | |
| 2002/0143603 A1 * | 10/2002 | Moore | 705/10 |
| 2002/0184116 A1 * | 12/2002 | Tam et al. | 705/27 |
| 2003/0037041 A1 | 2/2003 | Hertz | |
| 2003/0139979 A1 * | 7/2003 | Moore | 705/27 |

FOREIGN PATENT DOCUMENTS

WO    WO 9507510 A1 *    3/1995

OTHER PUBLICATIONS

Moving beyond the personalized document, Oct. 2002, Canadian Printer, vol. 110, Iss. 8. p. 28.*

* cited by examiner

*Primary Examiner*—Jeffrey A. Smith
*Assistant Examiner*—Jason B. Dunham
(74) *Attorney, Agent, or Firm*—Roberts Mardula & Wertheim, LLC

(57) ABSTRACT

A system and method for creating customized publications. Publication content is selected based on rules that associate particular content with customer profiles of individual recipients. In an exemplary embodiment, the customized publication is a product catalogue, the particular content is product information, and the recipients are customers. A rules engine associates the customer profile with a set of products comprising an offering. The rules engine determines which customers are to receive a custom customized catalogue, the size of the customized catalogue a customer is to receive, and the content of the customized catalogue for each recipient.

43 Claims, 12 Drawing Sheets

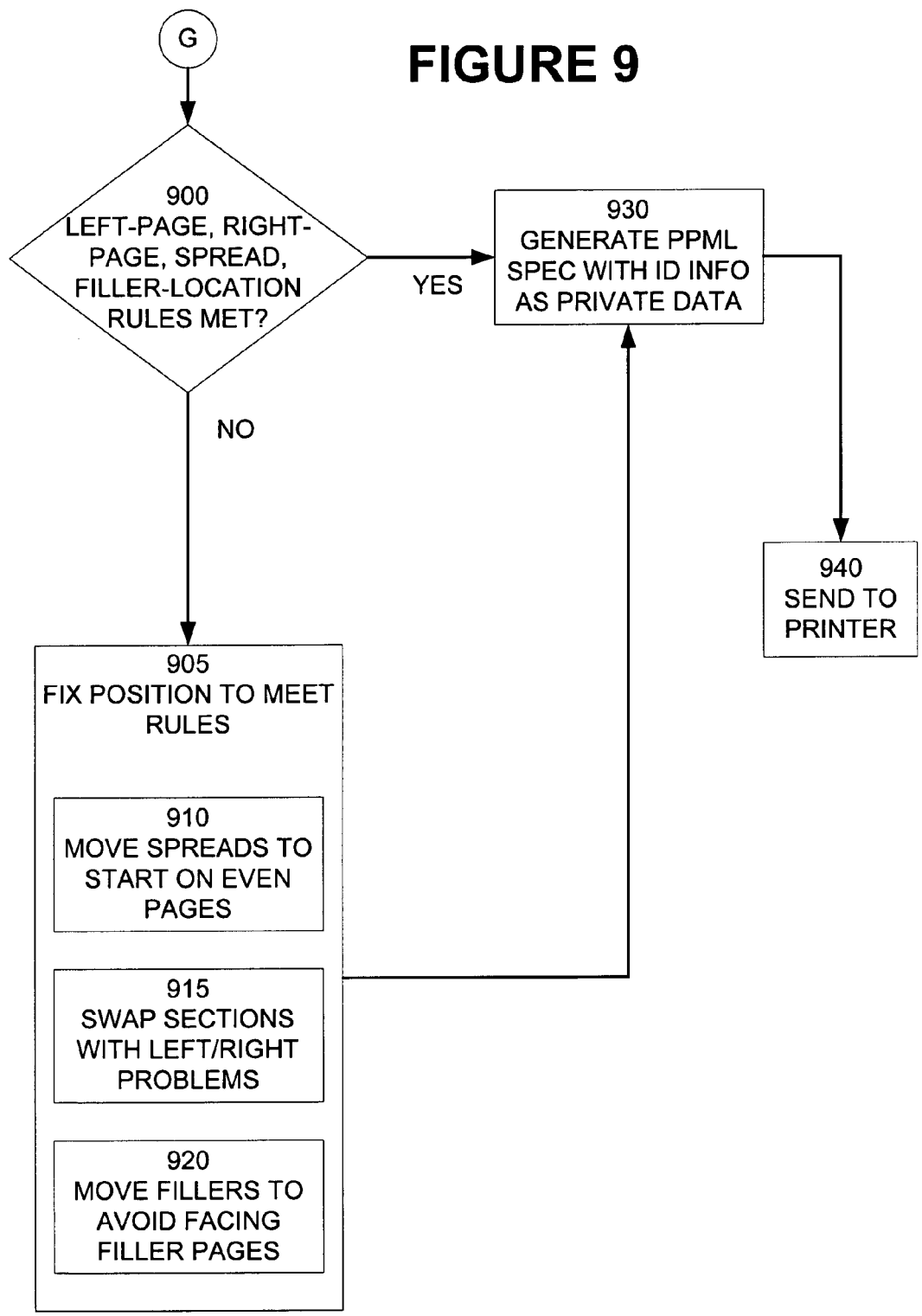

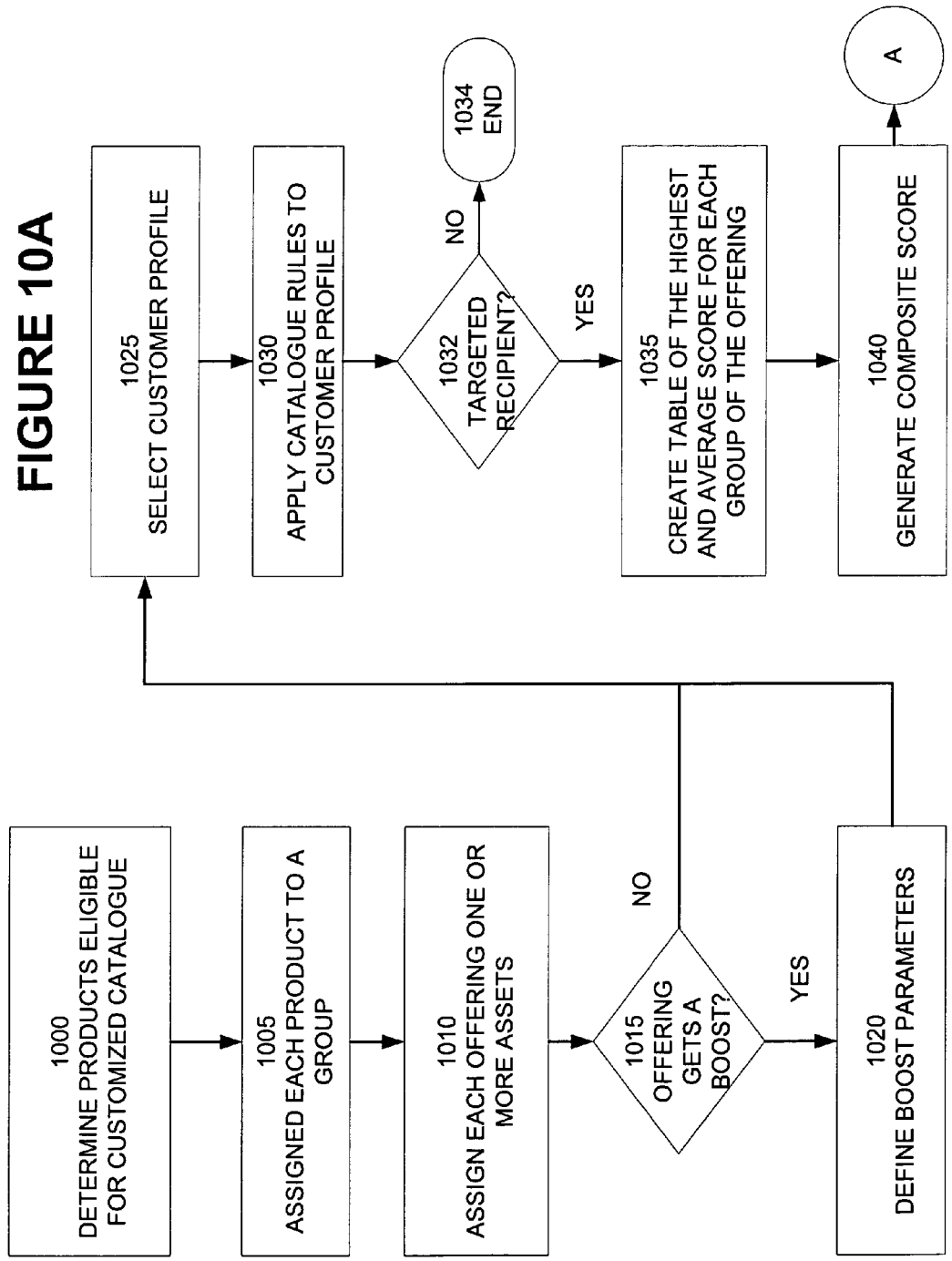

SYSTEM AND METHOD FOR CREATING CUSTOMIZED CATALOGUES

CROSS REFERENCE TO RELATED APPLICATIONS

This application claims priority under 35 U.S.C. § 119(e) from provisional application No. 60/415,984 filed Oct. 4, 2002. The 60/415,984 provisional application is incorporated by reference herein, in its entirety, for all purposes.

FIELD OF INVENTION

The present invention relates generally to the field of publications. More particularly, the present invention is a system and method for generating customized catalogues that are targeted to a specific recipient.

BACKGROUND OF THE INVENTION

Most publications, whether requested by an entity or sent to an entity unsolicited, are mass-produced with content that is selected to appeal to some percentage of the recipients. Newspapers, magazines, newsletters, and advertising material fit this description.

Catalogue advertising is a particularly apt example of this form of publication. Six days a week, the family mailbox is stuffed with unsolicited product literature, generically (but not affectionately) referred to as "junk mail." Typically, junk mail includes bankcard solicitations, coupons, flyers from supermarkets and store catalogues. To the recipient, this mound of paper is mostly unwanted and intrusive hounding by relentless hawkers of products and services.

To the businesses that send solicitations, flooding the consumer market with paper is a game of chance with a low, but finite probability of success. To many businesses, the mailed solicitation is the only vehicle for getting a message to a potential customer. In large part, junk mail has come to be accepted as a price for having a mailbox. Most of it is disposed of without even a glance. It is currently estimated that returns on unsolicited advertising are less than 1.5%.

While junk mail is relatively inexpensive to produce, there are hidden costs. It is extremely inefficient to use tons of paper, ink, and other resources to produce what is essentially trash and depleted forests. When disposal costs are considered, the cost-benefit of junk mail is marginal at best.

Product catalogues, in some respects, occupy a special niche. A recipient may spend time with a catalogue if the catalogue is from a business that the recipient is familiar with or from which the recipient has purchased products. The problem with catalogues is that they reflect products selected by the advertising entity, not the recipient. The selection criteria used by the advertising entity may have more to do with margins, inventory, and trends than with the interests of the person receiving the catalogue. The catalogue may contain a product of interest to the recipient, but the recipient has to find it before the recipient's interest in the catalogue wanes.

Making catalogues more useful to consumers is not easy. For technical reasons, catalogues are still created using film photography, typesetting, layouts, paste-ups, color correcting and stripping processes developed in the 80s and 90s that are costly and inefficient. In order to drive unit costs down, catalogues must be printed in bulk. Catalogues produced with current techniques are one-size-fits-all affairs.

There exists today a class of variable, digital printers that eliminates the need for film photography, negatives and plates. These systems use templates to define the layout and contents of their output. The template not only defines what is printed where, but also imposes constraints on the graphic or text block being printed. These simple objects must fit the space defined by the template. Resizing and/or reorienting are manual, time-consuming operations. Templates thus further inhibit customization and targeting even when using variable digital printers and pre-press technology.

It is noteworthy that catalogue retailers generally have data relating a customer to particular products (e.g., cosmetics, electronic goods, sporting goods), product attributes (e.g., color or size), seasonal interests (e.g., particular sports or activities), and price sensitivity. Repeat buyers make excellent candidates for targeted catalogues. The challenge is to find a way to produce such a catalogue economically and without imposing new technological demands on retailers.

Much has been written about the potential of on-line advertising as a replacement for mailed solicitations. And while e-commerce has its positive attributes, it has not replaced conventional brick-and-mortar shopping or mail-order shopping. In theory, the searchable aspects of the Internet allow prospective purchasers to seek products they desire. This "pull" approach to sales would seem more effective than the "push" approach embodied in the unsolicited mailed flyer. Yet, even on the Internet, we are bombarded with electronic junk mail. The push approach, maligned by some e-commerce advocates, has actually been taken to a new level. Another problem with the "pull" approach is the sheer volume of responses that a product query generates. Web pages are temporal and may be "lost" in the frenzy of surfing. Even when a product is found that matches a buyer's requirements, the buyer may be wary of trading on-line, especially with vendors with whom the buyer is unfamiliar.

The advantages of the paper catalogue are that it is tangible and may be referenced without wires, modems, network configurations, or special equipment. The advantages of e-commerce offerings however, is that a potential buyer may "pull" information that is targeted to that buyer's needs or desires.

Newspapers and similar publications share some of the same drawbacks as product catalogues. Articles are typically selected for a publication based on its appeal to the majority of subscribers. Because of space limitations, articles that may appeal to a particular recipient are dropped in favor of an article with more mass appeal.

A number of approaches to targeting information to particular users have been suggested. U.S. Pat. No. 6,460,036 by Hertz (the "Hertz Patent") describes a system for identifying desirable objects, such as news articles, in an electronic media environment. A "target profile" for each target object is constructed. A user profile of a user's attributes, including age/zip code/etc. is constructed. A summary of digital profiles of target objects that a user likes and/or dislikes (termed the "target profile interest summary" of that user) is created. The system evaluates the target profiles against the users' target profile interest summaries to generate a user-customized rank ordered listing of target objects most likely to be of interest to the user. These target objects are then presented to the user for selection.

U.S. Pat. No. 6,298,348 by Eldering (the Eldering Patent) and U.S. Patent Publication No. 20010004733 by Eldering (the Eldering Application) describe an advertisement selection system. An ad characterization vector is transmitted along with a consumer ID. The consumer ID is used to retrieve a consumer characterization vector which is correlated with the ad characterization vector to determine the suitability of the advertisement to the consumer. The consumer characterization vector describes statistical information regarding the demographics and product purchase preferences of a consumer, and is developed from previous purchases or viewing habits. A price for displaying the advertisement can be determined based on the results of the correlation of the ad characterization vector with the consumer characterization vector. The ad may be printed and sent to the consumer or prepared as an insert to a publication received by the consumer.

Both the Hertz Patent and the Eldering Application described means for selecting objects of interest to a user based on a user profile. However, neither of these references teaches how to automate the production of a customized catalogue comprising such objects.

What would be useful would be an inexpensive, automated and fast means of producing a customized catalogue that comprises content that has a high probability of being of interest to a particular recipient or that reflect subject matter reflecting a specific request of a recipient and the requirements and objectives of the retailer.

SUMMARY OF THE INVENTION

An embodiment of the present invention is a system and method for producing a customized catalogue that is targeted to the interests and/or needs of a recipient.

It is therefore an aspect of the present invention to create a customized catalogue that matches the interests and/or needs of a recipient.

It is yet another aspect of the present invention to increase the effectiveness of product catalogues.

It is still another aspect of the present invention to eliminate the use of film photography, typesetting, layouts, paste-ups, color correcting and stripping processes in catalogue production.

It is an aspect of the present invention to produce a customized catalogue without using a template.

It is another aspect of the present invention to assemble text, graphics and photographs into digital assets that are combined as objects and to use object-oriented technology to arrange text, graphics and photographs on a page to produce a customized catalogue image.

An embodiment of the present invention is a system and method for generating customized catalogues targeted at individuals (or entities) based on rules that associate customer profile information to product information. Product information (text, graphics and photographs) is stored in digital form and combined to form objects. Objects have attributes that determine where the object is located on a page and how it is to be displayed. Objects are used to construct pages of customized catalogues that are customized to a specific recipient.

In one embodiment, the rules that determine the association between customer profile information and product information are multilayered and weighted. For example, a rule might filter products based on the recipient's profession (doctor) followed by the recipient's specialty (cardiovascular).

In another embodiment, the customized catalogue is generated based on specific products requested by an individual or entity.

BRIEF DESCRIPTION OF THE DRAWINGS

FIG. 9 illustrates a catalogue finishing process according to an embodiment of the present invention.

FIGS. 10A and 10B illustrate a process by which the content of a customized catalogue is selected for a targeted recipient according to an embodiment of the present invention.

DETAILED DESCRIPTION OF THE INVENTION

An embodiment of the present invention is a system and method for producing a customized catalogue targeted to the interests and/or needs of a recipient. For the purpose of the following discussion, the following terms are defined for the sake of clarity. Any italicized terms are defined elsewhere in the list. This list is not alphabetical, since it is intended to make sense as a whole.

Product inventory—all the products a catalogue retailer offers for sale.

Candidate offering—one of a collection of products that are selected from the product inventory that are available for inclusion in a customized catalogue for a particular campaign.

Selected offering—one of the candidate offerings that is selected for possible inclusion included in a customized catalogue.

Catalogue offering—a selected offering that is included in a customized catalogue.

Campaign—a promotion intended for a specific date range, typically sharing a specific theme.

Item—a single piece of merchandise that can be purchased by itself. Each item has an offering price, an ID number, and descriptive information, including size range(s) if any, color availability if any, etc. In some cases, the offering price may differ based on such factors as size range, etc.

Offering price—the price at which the item is advertised in the catalogue. This may differ from the regular price as maintained in the company's inventory or similar system.

Rule—a logical statement that determines, for example, whether a customer receives a customized catalogue and if so, the number of pages of that catalogue; the selection of candidate offerings, selected offerings, and catalogue offerings; and the layout of catalogue offerings on catalogue pages.

Rules engine—a system for applying one or more rules to a data set.

Creator—a system comprising a general purpose computer and software and a Rules engine adapted to select content from an assets database, for inclusion in a customized catalogue for each recipient, and whether a specific customer has a catalogue created for him. In addition, the creator properly arranges the selected content into composite assets (advertisements) comprising a layout, a type, graphics and photographs, including possible personalization of the type within the layout. The creator is further adapted to combine all of these elements into specifications for pages and sections, and prepares electronic instructions such that the catalogue can be printed on a variable digital printer.

Print Controller—a general purpose computer comprising software adapted to receive publishing specifications and graphic elements from the creator and dispatches them under command of a printing-press operator to one or more digital presses for final production. Final product comprises printing the catalogue pages and optionally merging in pre-printed pages, folding, binding and trimming the catalogues, and preparing the catalogues for mailing.

Figure 1:
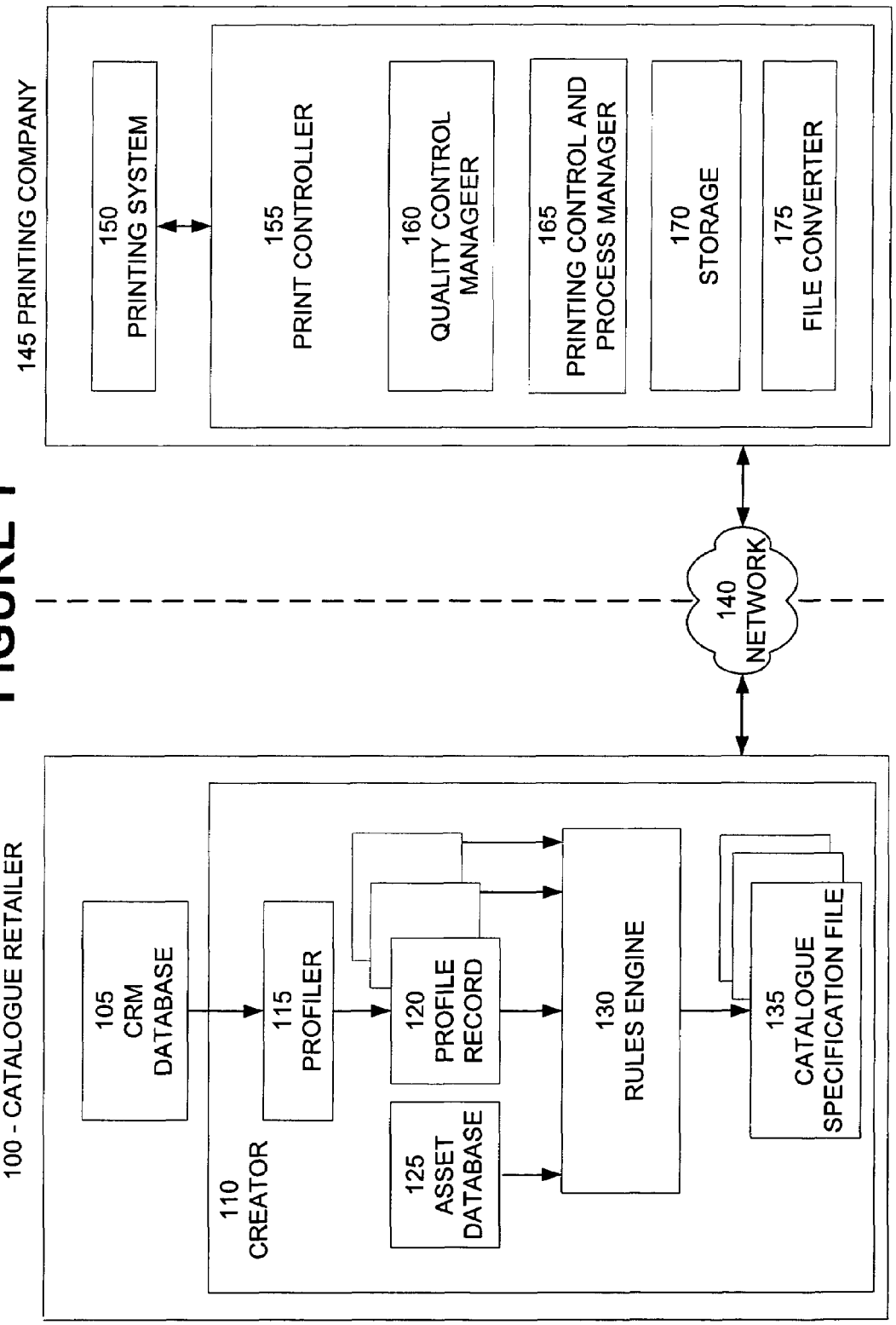
FIG. 1 illustrates a block diagram of a custom catalogue publication system (CCPS) according to an embodiment of the present invention.

FIG. 1 illustrates a block diagram of a customized catalogue system (CCPS) according to an embodiment of the present invention. In this exemplary embodiment, the customized catalogue is a product catalogue. A catalogue retailer 100 operates a customer resource management (CRM) database 105 and a creator 110. The CRM database 105 comprises a data record relating to each customer of the catalogue retailer 100. By way of illustration and not as a limitation, a data record within the CRM database 105 comprises:

Customer name
Customer address
Purchase history
Returned-goods history
Payment problems history
Customer correspondence
Customer preferences
Household makeup (spouse, children, etc.)

The creator 110 comprises a profiler 115, one or more profile records 120, a candidate offerings database 122, an asset database 125, a rules engine 130, and a catalogue specification file 135 for each one of the one or more profile records. The profiler 115 receives data from the CRM database 105 and creates a customer profile 120 for each customer for which a data record is held in the CRM database 105. By way of illustration and not as a limitation, a customer profile record 120 comprises a set of related objects reflecting the demographics, preferences, purchase and returns history, "bonus points" added manually or programmatically by the catalogue retailer to affect how the system interprets the raw customer data, and records of each product previously included in a customized catalogue for that customer. In another embodiment of the present invention, the profiler 115 extracts data from the CRM database 105 on a nightly basis and updates each customer profile record as appropriate.

The asset database 125 comprises product information in digital form ("assets") relating to all of the products offered by the catalogue retailer. Product assets comprise one or more product attributes that describe or characterized a particular item. Products may be grouped based on their product attributes. Groups may be defined in a hierarchical manner (e.g., categories, subcategories, and so on). By way of illustration and not as a limitation, product data may be arranged by department (men's wear, ladies' wear, sporting goods, automotive supplies, beauty aids, jewelry), by category (Missies, Petites, Women's, Plus Sizes), and subcategory (coats, jackets, blouses, pants, skirts, suits, accessories). There is no intrinsic limit to the number of levels into which the full range of merchandise may be classified. The only constraint on this hierarchical structure is each item described as part of a grouping below its "parent" must also be part of each level above it. Product assets (e.g., text, graphics and photographs) are stored separately asset database or assembled into composite digital assets that are themselves stored in the asset database 125. Assets are combined as objects that are used to arrange the assets on a page to produce a customized catalogue display. Candidate offerings database 122 comprises the candidate offerings for the campaign to which the customized catalogue is directed.

The rules engine 130 receives information from both the candidate offerings database 122 and a targeted recipient profile record 120. Based on a set of offering rules, the rules engine 130 uses the targeted recipient profile record 120 to identify a set of selected offerings for a particular targeted recipient. The assets for each selected offering are acquired from the asset database 125 and a catalogue specification file 135 is produced for each targeted recipient profile record 120. Among the tasks assigned to the rules engine 130 are to:

Apply catalogue rules to determine whether a targeted recipient will receive a customized catalogue for a particular campaign.

Apply offering rules to a set of candidate offerings to produce a set of selected offerings.

Apply a set of ranking rules to each of the selected offerings to determine its relevancy ranking by which the selected offering is qualified to be included in a customized catalogue and, if included, allocated space and position within the customized catalogue.

Apply the set of offering rules to acquire the appropriate copy and graphic "assets," and apply the set of page allocation rules and the layout rules to place the acquired assets into the allocated category or subcategory pages.

Compose all text in a targeted recipient's language of choice (determined by reference to that targeted recipient's profile record 120) where the asset database comprises copy for all offerings in that language.

Include into the format of the catalogue, in addition to the product-selection pages, any special sections (front and back covers, order forms, company and third-party ads, fillers, etc); and Create a detailed customized catalogue specification (in PPML, XML or Postscript, for example) that can be used by, or converted into a final form to drive one or more digital color presses.

In an embodiment of the present invention, the site of the catalogue creation is not contiguous with the site of the printing presses. In this embodiment, each customized catalogue specification file is sent from the catalogue retailer 100 to a printing company 145 over a network 140. The catalogue retailer may employ an unrelated commercial printing company, a related printing company, a printing department within its own organization, or even in the case of relatively small-scale retailers, may integrate the creator and print controller into the same department or even onto the same computer system. In an alternate embodiment, the creator and print controller are connected via a network. By way of illustration and not as a limitation, the network is the Internet, a virtual private network, a wide-area network, a local-area network or a direct physical connection.

The printing plant 145 operates a printing system 150 and print controller 155. In an embodiment of the present invention, printing equipment 150 comprises a plurality of RIP engines and digital printers, however this is not meant as a limitation. As would be apparent to those skilled in the art, any printing system that is capable of interpreting the catalogue specification file may be used without departing from the scope of the present invention. The print controller 155 comprises a quality control manager 160, a printing control and process manager 165, storage 170, and a file converter 175. Among the tasks assigned to the print controller 155 are to:

Convert the catalogue specification file 135 received from the Creator 110 to a form (such as Postscript or PPML) that can be used by the printing system 150.

Store each catalogue specification file 135 in storage 170.

Allow the operator of the printing company 145 to designate which job and which specifications for that job are to be printed and when, to designate which printer is to print that group of specifications, to record when each production step is completed and flag those not completed for the attention of the operator, and to reprint any specific catalogue or range of catalogues upon command.

Figure 2:
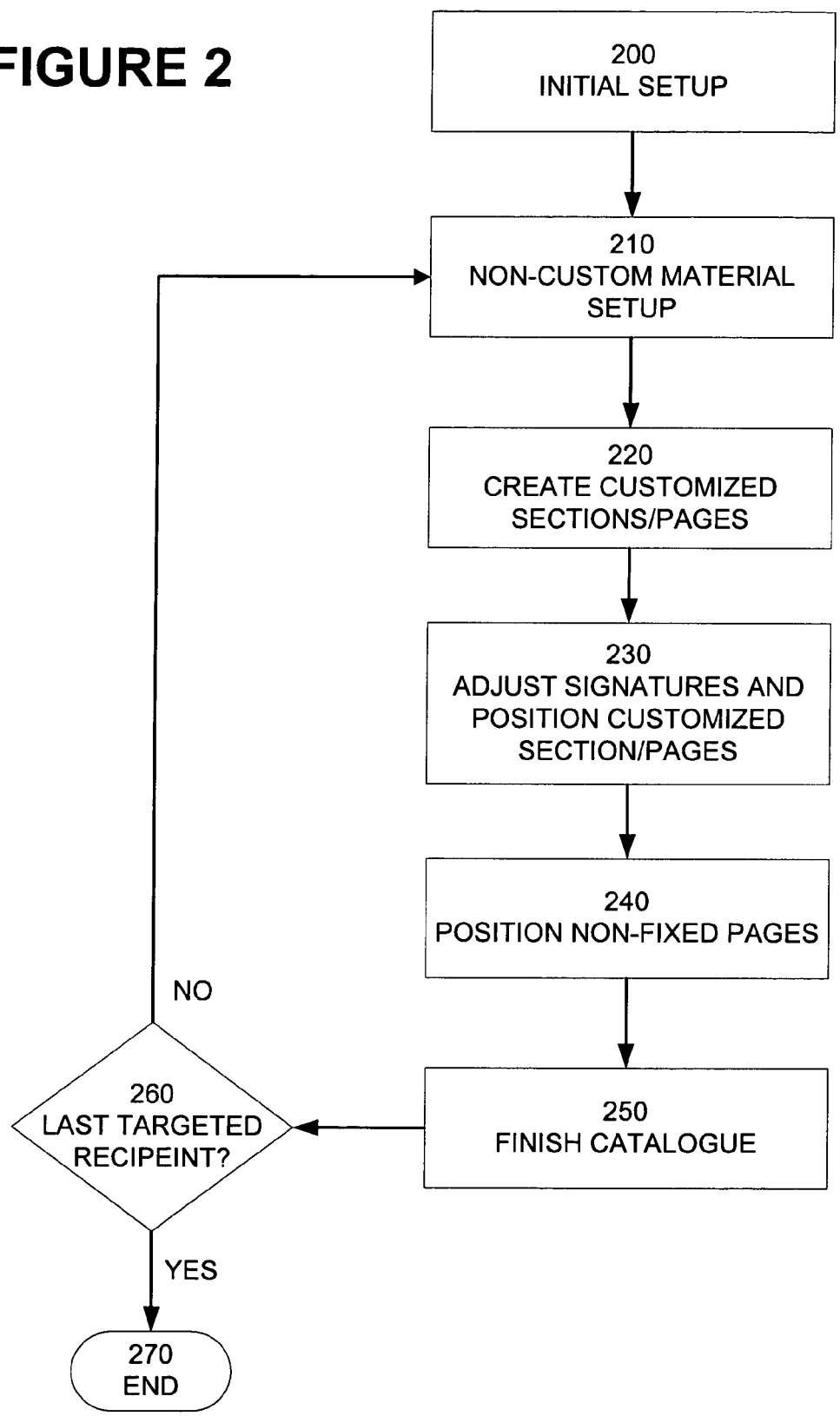
FIG. 2 illustrates a flow diagram of a process of creating a customized catalogue according to an embodiment of the present invention.

FIG. 2 illustrates a high level flow diagram of a process of creating a customized catalogue according to an embodiment of the present invention. As previously indicated, the process flow is described in terms of a customized product catalogue. Referring to FIG. 2, an initial set up process is performed 200. The initial setup process comprises inputting the settings for a particular job (e.g., a specific catalogue run). A non-custom material setup procedure is performed 210. The non-custom material setup procedure comprises getting specifications for all fixed-position pages and composing or retrieving all fixed-position, non-custom material pages. Customized pages/sections are created 220. A set of signature rules are applied to adjust the "signature" of the catalogue such that the page count is divisible by a defined signature value and the product pages/sections are positioned 230. The non-fixed pages are positioned 240 and the catalogue is finished 250. In an embodiment of the present invention, "finishing" comprises printing. In an alternate embodiment of the present invention, "finishing" comprises formatting the catalogue in a format that can be read electronically. A determination is made 260 whether the targeted recipient of the catalogue is the "last" targeted recipient selected to receive a customized catalogue. If the targeted recipient is not the last targeted recipient, the process returns to the non-custom material setup process 210 for the next recipient. If the targeted recipient is the last targeted recipient the process ends 270.

Figure 3:
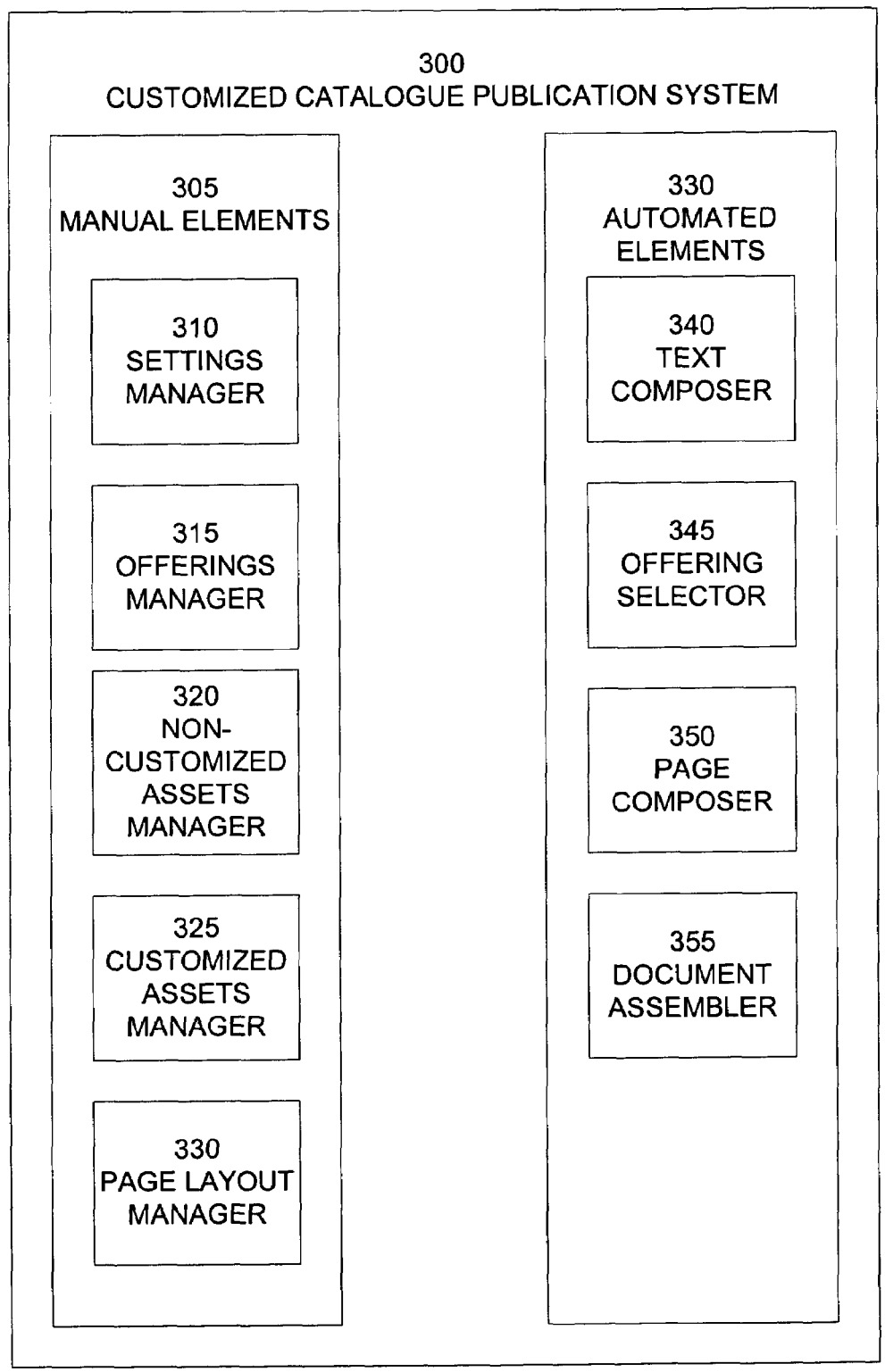
FIG. 3 illustrates a block diagram of the logical elements of a customized catalogue system (CCPS) according to an embodiment of the present invention.

FIG. 3 illustrates a block diagram of the logical elements of a customized catalogue system (CCPS) according to an embodiment of the present invention. CCPS 300 comprises manual elements 305 and automated elements 330. Manual elements are tasks that require manual intervention by a human operator and comprise a settings manager 310, an offerings manager 315, a non-customized assets manager 320, a customized assets manager 325, and a page layout manager 330. In an embodiment of the present invention, the manual elements 305 are managed by software accessed through a graphical user interface.

Automated elements 335 comprise a layout composer 340, a text composer 342, an offering selector 345, a page composer 350, and a document selector 355. The automated elements 335 are tasks that are performed on the results of the tasks performed by the manual elements 305. Automated elements 330 are performed automatically based on rules and logic imposed by the various elements.

Referring to both FIG. 2 and to FIG. 3, the initial setup process 200 is performed using the manual elements 305. The non-custom material setup procedure 210, the creation of the customized pages/sections 220, the adjustment of the signature and the positioning of customized pages/sections 230, the positioning of non-fixed pages 240, and catalogue finishing 250 are accomplished using the automated elements 330.

EXEMPLARY EMBODIMENT

The following discussion is directed to an exemplary embodiment of a CCPS used to generate a customized catalogue. Details of this exemplary embodiment are illustrated in FIGS. 4, 5, 6, 7, 8, 9 and 10. In this exemplary embodiment, the "non-customized assets" are non-product assets, the "customized assets" are product assets, and the targeted recipient is a customer of a catalogue retailer.

Figure 4:
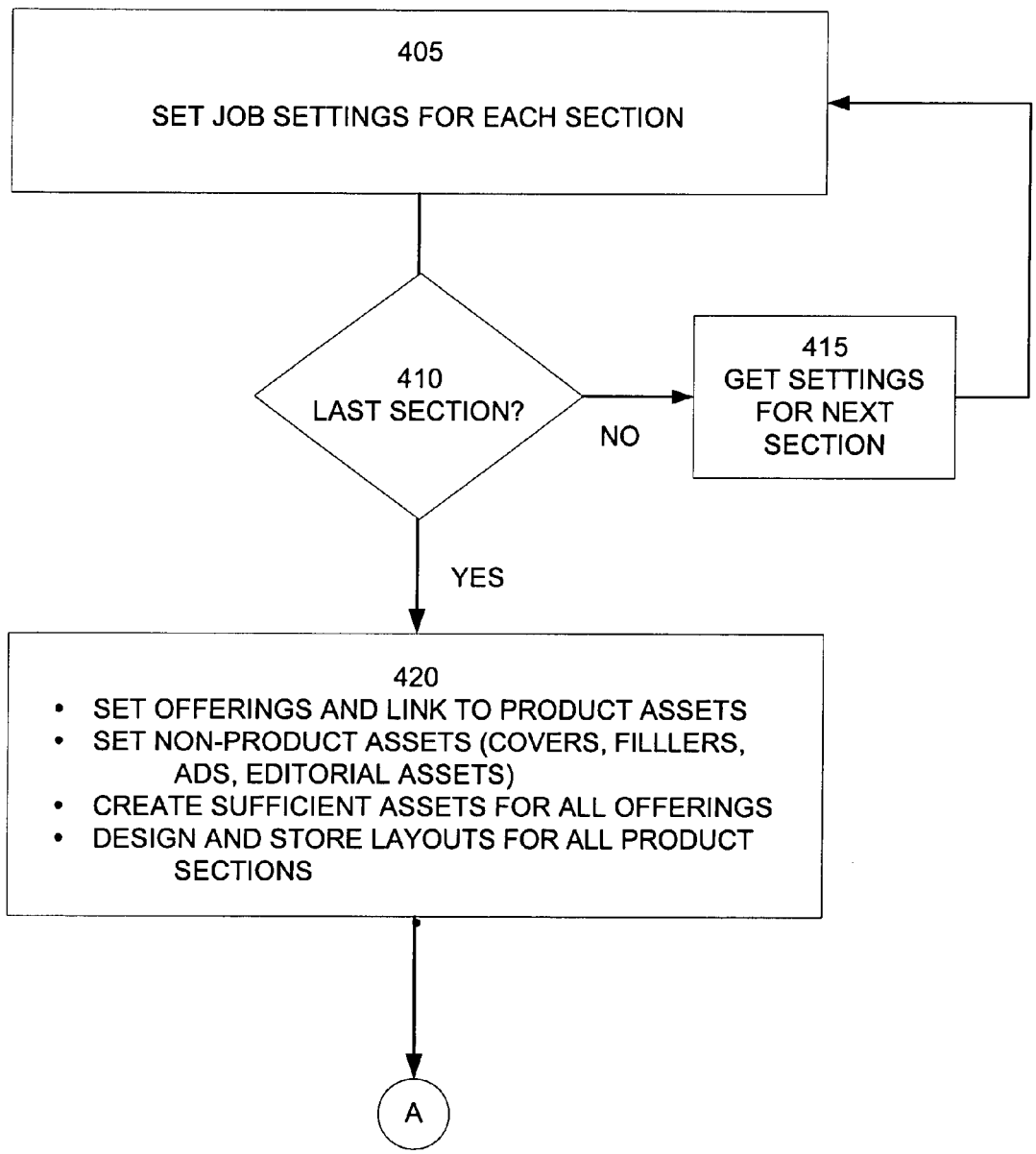
FIG. 4 illustrates a flow diagram of an initial setup process according to an embodiment of the present invention.

FIG. 4 illustrates a flow diagram of an initial setup process according to an embodiment of the present invention. As noted previously, the initial setup process is performed using the manual elements 305 of the CCPS 300 (see FIG. 3). Referring to FIG. 4, job settings for a section of a particular job are defined 405. In an embodiment of the present invention, collections of settings are defined in a manner that establishes a hierarchy of increasing detail. In this embodiment, the collections of settings are global, job, section, spread, and page. A particular level inherits the settings of the levels that precede it. A succeeding level may modify a setting inherited from a preceding level.

Global settings establish settings common to all jobs. For example, a retailer desiring to maintain a consistent feel to its catalogues might establish global settings for page size, trim rules, type preferences, and page numbering. Alternatively, any of these settings may be defined at the job (i.e. campaign or document) level.

A document (or job) is made up-of one or more sections, each of which may be of any whole or fractional size. Sections consist of three types:

Product Sections

Non-Product Sections

Preprinted Sections

Product and non-product sections may be any number of full or partial pages in size. Preprinted sections, however, must always be a multiple of two pages, and the sum of all pre-printed pages must be divisible by the signature of the catalogue pages.

A section may be designated "required" or "filler." Filler sections (typically one or two pages in size) are used to force a document to have a total number of pages divisible evenly by the catalogue signatures.

A page is an element of a section. A section is made up of pages, although when fractionated sections are permitted, a page may have portions of more than one section.

A spread is a special case of a page and comprises two consecutive pages starting with an even-numbered (left hand) page.

By way of illustration and not as a limitation, the catalogue rules that may be established for a particular job include:

Size of catalogue—minimum and maximum number of pages may be set for the job, or a series of ranges may be attached to individual rules. For example, the retailer may decide to create catalogues of 48–64 pages for customers who have spent in excess of $15,000 in the past year, 40–48 for those $10-000–$15,000, 28–36 for those from $5,000–$10,000 and zero pages for those under $5,000 (in other words, no customized catalogue at all).

Allow Fractional Sections—When this is "No," the number of pages in each section must be specified as an integer.

Number of Sections—Similarly, the number of sections may be set to a range of pages, and again the page ranges may be attached to other rules, such as total size of the customized catalogue or spending habits of customers, etc.

Average Products per Page—Catalogue retailer wishing a "tight" customized catalogue may specify an average of 10 or more offerings per page in the product sections, while others may want to average only 2 or 3 (or even 1) per page. In an embodiment of the present invention, the more luxurious the product line, the larger the space devoted to each product, and therefore the lower the number of offerings put on each page.

Method of Forcing Page-Count to Even Signatures—There are four separate methods that may be set to bring the number of pages to even signatures:
Always delete 1–3 pages
Always add 1–3 pages
Round up; always delete 1 or add 1 or 2 pages
Round down; always delete 1–2 or add 1 pages Additional rules are needed to specify the order in which pages are deleted when necessary, and if product pages must be added, which sections should get them.

Method of Adding pages if Required—The user may specify that pages to be added are either:
Filler Pages
Product Pages, which may be increased by
Adding additional products to the catalogue
Increasing the amount of space allocated to some products to make one or more sections take additional pages, or
A combination of the above two techniques Numbering Style and Position of Page 1—customized catalogues may be unnumbered, or numbered in integers, letters or roman numerals, and may have the front cover, inside front cover, first inside page or any other page designated Page 1.

A change from the standard department/category/subcategory classification system for offerings and sections Additional jurisdictions data for tax, currency and pricing variability Referring again to FIG. 4, a determination is made as to whether the section is the "last" section 410. If the section is not the last section, the job settings for the "next" section of a particular job are defined 405. If the section is the last section, the initial setup process continues 420.

Selected offerings for a customized catalogue are determined and are linked to product assets. An offering comprises one or more products offered at a specific price or (sometimes separate prices) during a date range. Products assets are graphics and words that describe them. For example, a product asset may comprise a photo, a headline, a description, a product ID, and a price. However, this is not meant as a limitation. A product may be available in two or more size ranges each of which may each have a separate ID number and price. Further, the photo may show several products at once, each available separately (e.g. hat, scarf, sweater, blouse, gloves, skirt, leggings and boots), and each product would have its own description and set of sizes, IDs and prices. Moreover, the description for any offering or product may comprise several blocks of text that may be used depending on allocated space. In addition, a single offering could involve more than one photo, to be used appropriately when the allocated space is large, medium or small. And finally, all of the headline and description elements may be available in two or more languages, depending on support for the customer's language preference.

Referring again to FIG. 4, non-product assets are set. A non-product asset comprises material used for covers, fillers and other materials, including optional tables of contents, indices, order forms, and other non-product specific material. These assets are often combined into entire pages, but in other cases may be intended to fit into other pages as features, fillers or ads. Some of the ads may be paid for by manufacturers or wholesalers on some cooperative advertising program. Ads and editorial assets may be designated:
Mandatory (include in every catalogue)
Mandatory with Section (include in every catalogue that contains the specific section referenced)
Optional (treat as filler material)

A check is made to verify that sufficient assets have been created for all offerings. Each offering typically requires more than one photo suitable for use at various sizes, but each offering must have at least one set of materials to allow the system to create a coherent presentation in the customized catalogue. Layouts for all product section are designed and stored. Working from a palette of themes and page layouts, a catalogue retailer assigns one or more existing or new themes and layouts to each section. When there is more than one layout or theme assigned to a section, the catalogue retailer will establish rules to permit automated systems to select the correct layout for each page in the section. For example, a specific theme or layout could be designated to left- or right-hand pages only, or only for the first page of a section, or even only first page if it's on a left-hand or right-hand page.

Figure 5:
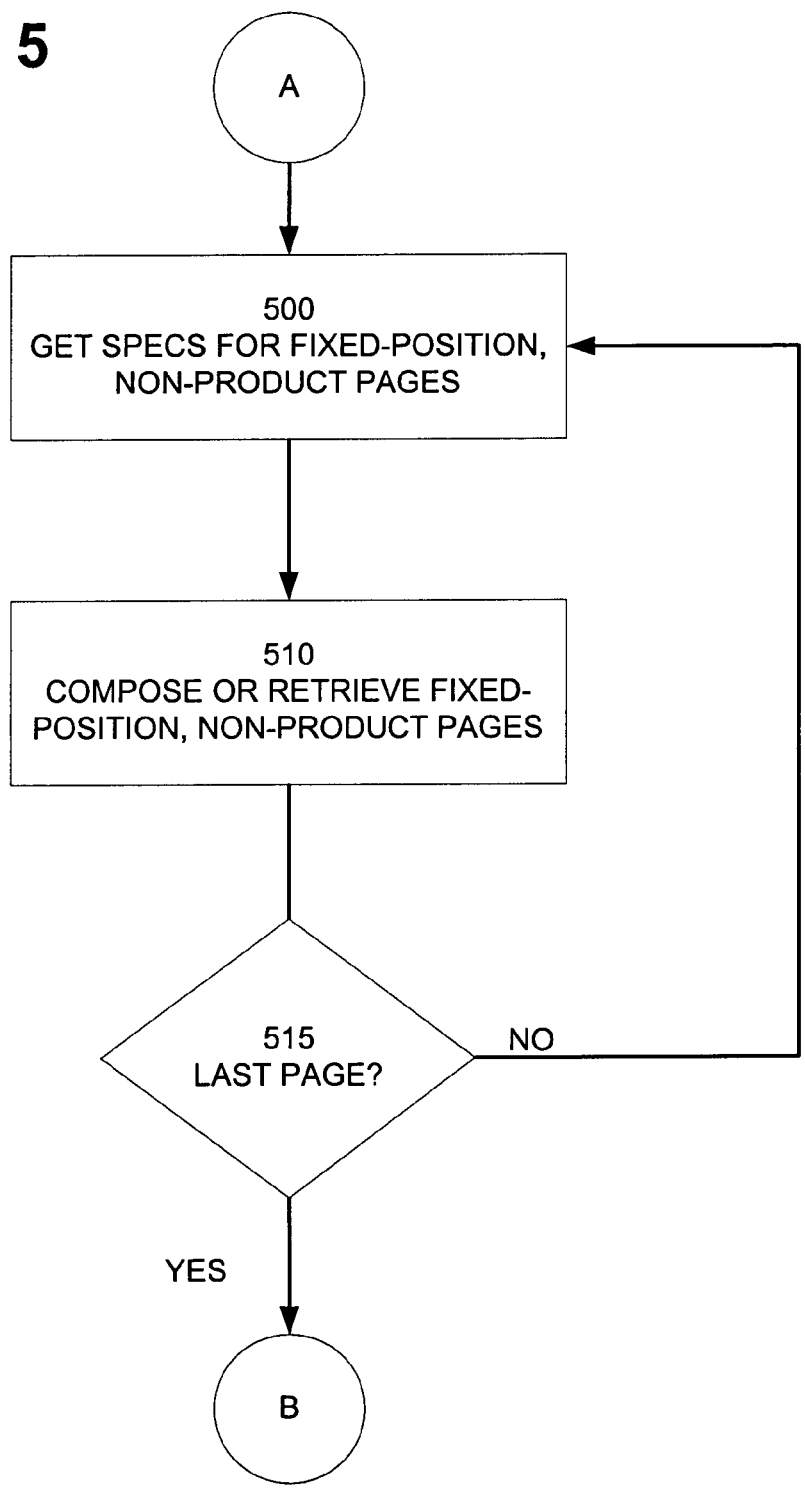
FIG. 5 illustrates a flow diagram of a non-product setup process according to an embodiment of the present invention.

After the settings for a section are defined, a check is made to determine if that section is the last section 410. If the section is the last section the initial setup process for the job is completed and the process continues with the non-product setup procedure (FIG. 2 above and FIG. 5 below). If the section is not the last section, the settings for next section are obtained 415 and the initial setup process is performed again 400. At the end of the initial setup process, each of the available sections of the job is named and given attributes of offerings that may be included within that section, what layouts are available to it, any special themes or other artwork that must be included, and similar information.

FIG. 5 illustrates a flow diagram of a non-product setup process according to an embodiment of the present invention. The non-product setup process uses the page composer element 350 of the CCPS 300 (see FIG. 3). The specifications for fixed-position, non-product pages are obtained 500. In an embodiment of the present invention, fixed-position pages include both outside covers plus one or more additional sections. Positions are defined set in relation to the cover or the content. For example, the following position definitions may be used: Front Cover+0-n pages, Back Cover+0-n pages, or Middle±0-n pages. In the latter example, "middle" means the page number that is exactly half the total number of pages in the customized catalogue. The middle page number always references a left-hand page.

In addition, a position may be fixed in respect to a specific section at any of three subpositons:

Before
After
Inside

If a section cannot accommodate an inside page (size=1 or section consists only of a spread) inside pages are placed after the designated section.

Referring again to FIG. 5, fixed-position, non-product pages are composed or retrieved 510. A fixed-position, non-product page may be fully composed, or it may comprise areas for personalization. These include front and back covers (including full postal address with barcodes), table of contents and index. Additionally, the front and back covers may actually be product pages and not fixed-position, non-product pages.

A check is made to determine if the page is the last page 515. If the page is not the last page, specifications for the next fixed-position, non-product page is obtained 500. If the page is the last page, and the non-product setup procedure is complete and the process continues with the product section/page creation process (FIG. 2 above and FIG. 6 below).

Figure 6:
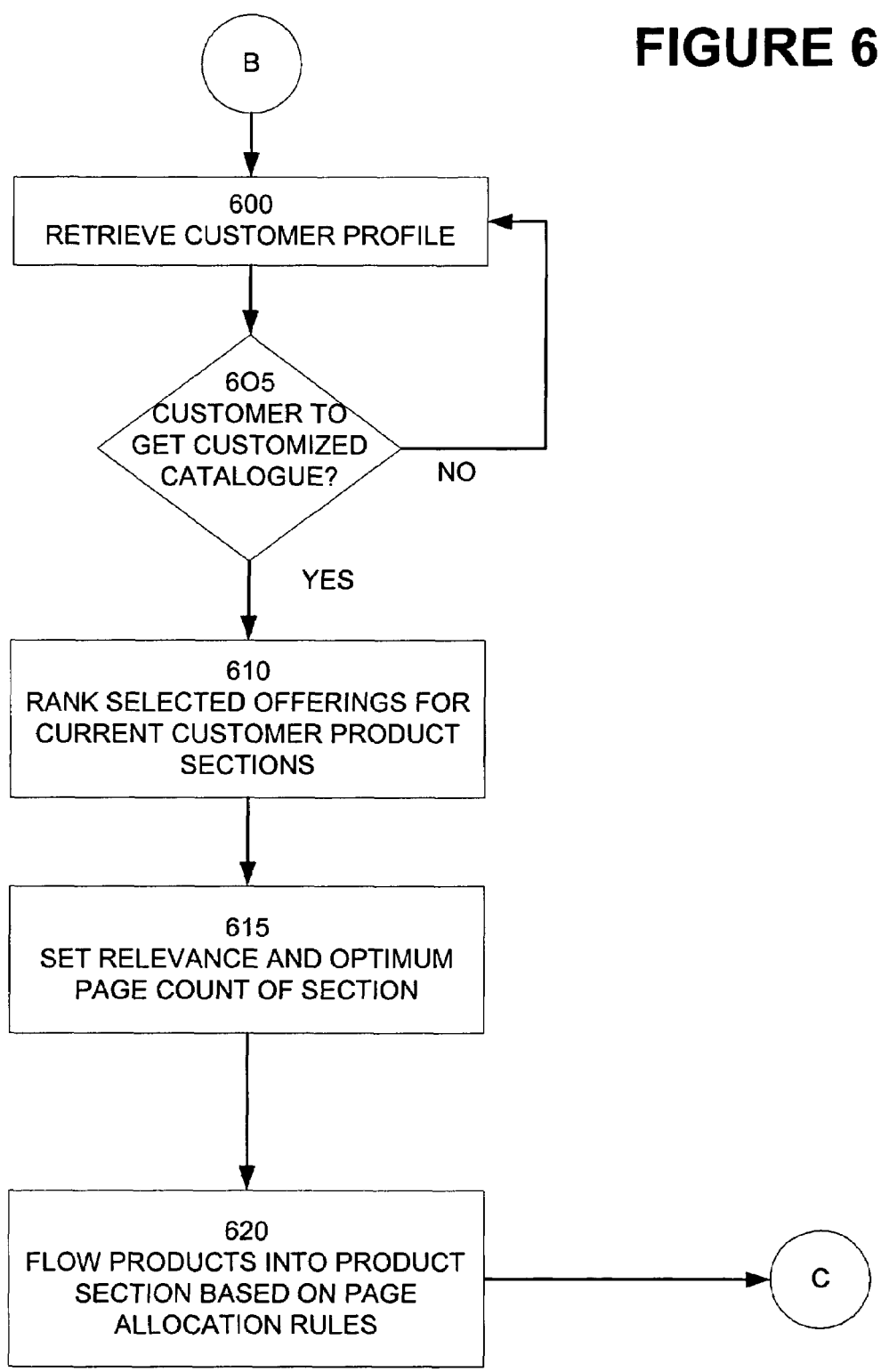
FIG. 6 illustrates a flow diagram of a product-section/page creation process according to an embodiment of the present invention.

FIG. 6 illustrates the continuation of the flow diagram of a product section/page creation process according to an embodiment of the present invention. The product section/page creation process is performed using the offering selector element 345 and the page composer element 350 (see FIG. 3) and sets up every product page in the catalogue based on offering rules correlating attributes of a customer profile with attributes of an offering.

A customer profile is retrieved 600. A determination is made whether the customer is entitled to receive a customized catalogue 605 based on catalogue rules established by the catalogue retailer. If the customer is not entitled to receive a customized catalogue, another customer profile is selected 600. If the customer is entitled to receive a customized catalogue, the selected offerings are ranked 610 by applying a set of ranking rules to the customer profile to the selected offerings is identified from the candidate offerings.

The selected offerings are evaluated for relevance 615 based on business rules and an optimum page count of the section is established. If the customer profile shows a high degree of purchase interest in a specific category or subcategory, selected offerings within that category or subcategory are given high relevancy scores. Individual selected offerings may be given "boosts" or "minuses" that give their relevancy extra or fewer points, resulting either in more space and/or better position than average for the section, or in the case of minuses, less space and/or poorer positioning. Additionally, a retailer may give plus or minus "boost" factors to specific offerings due to specific company policies, typically in relation to profit margins, volume discounts, cooperative advertising support, current stock levels, etc. For example, a product in short supply may not justify the expense of inclusion in a catalogue addressed to millions of customers and prospects, but including it in personalized catalogues.

When all the selected offerings are thus scored in their individual categories, the most relevant category is allocated the highest number of pages permitted for that section; then each of the other product sections is similarly allocated an appropriate number of pages relative to the total size of customized catalogue required for that customer. This process may result in one or more selected offerings being excluded from the customized catalogue. Those selected offerings that are included on the customized catalogue are referred to as "catalogue offerings."

A typical customized catalogue may have, by way of illustration, 200–300 products, chosen from a universe of any number of candidate offerings (though typically the universe of candidate offerings for a specific campaign my be less than a few thousand). By applying the offering rules to a customer profile and the set of candidate offerings, a set of selected offerings is generated for the customer represented by the customer profile. Each selected offering is run through a set of ranking rules and a score assigned to the selected offering for that customer. Catalogue rules are also applied to the customer profile to determine whether the customer is entitled to receive a customized catalogue, the number of pages and sections of that customer's customized catalogue, and the number of number of offerings per page. Against these constraints, the page allocation rules are applied to the selected offerings to determine what selected offerings (now a catalogue offering) are included in the customized catalogue (low-ranking selected offerings may be excluded from a section), where the catalogue offering is located in the customized catalogue, how much space is allocated for a particular catalogue offering. Typically, the higher the rank of a catalogue offering, the more space and better position the offering gets in its category section.

The catalogue offerings (e.g., products selected for inclusion in the products section) are flowed into each section based on layout rules established by the catalogue retailer 620. By contrast, the older fill-template method utilizes a template having a number of predefined areas on the page, each linked through rules to a set of texts, graphics or photographs that can be inserted in the demarcated space. Templates do not, however, provide for ability of assets to grow or shrink in response to the amount of text to be typeset even for a specific item (for example, when the text can be selected from French, Spanish, German or English depending on the language preference of the recipient). "Flowing" assets comprises placing one item into a blank page, assessing the remaining space and deciding what can fit properly there, and so on until the page is complete, so that the probability of finding exact layout on different catalogue pages is extremely low. Referring to FIG. 3, the product assets are provided by the customized (products) assets manager 325. The layout for each page of the section is provided by the page layout manager 330. The text for each offering is typeset by the text composer 340 (including personalization of the words if called for by the offering or graphic asset) and positioned on the page by the page composer 350. At this point, all sections are completed and the catalogue is composed. The customized catalogue is not yet assembled.

Figure 7A:
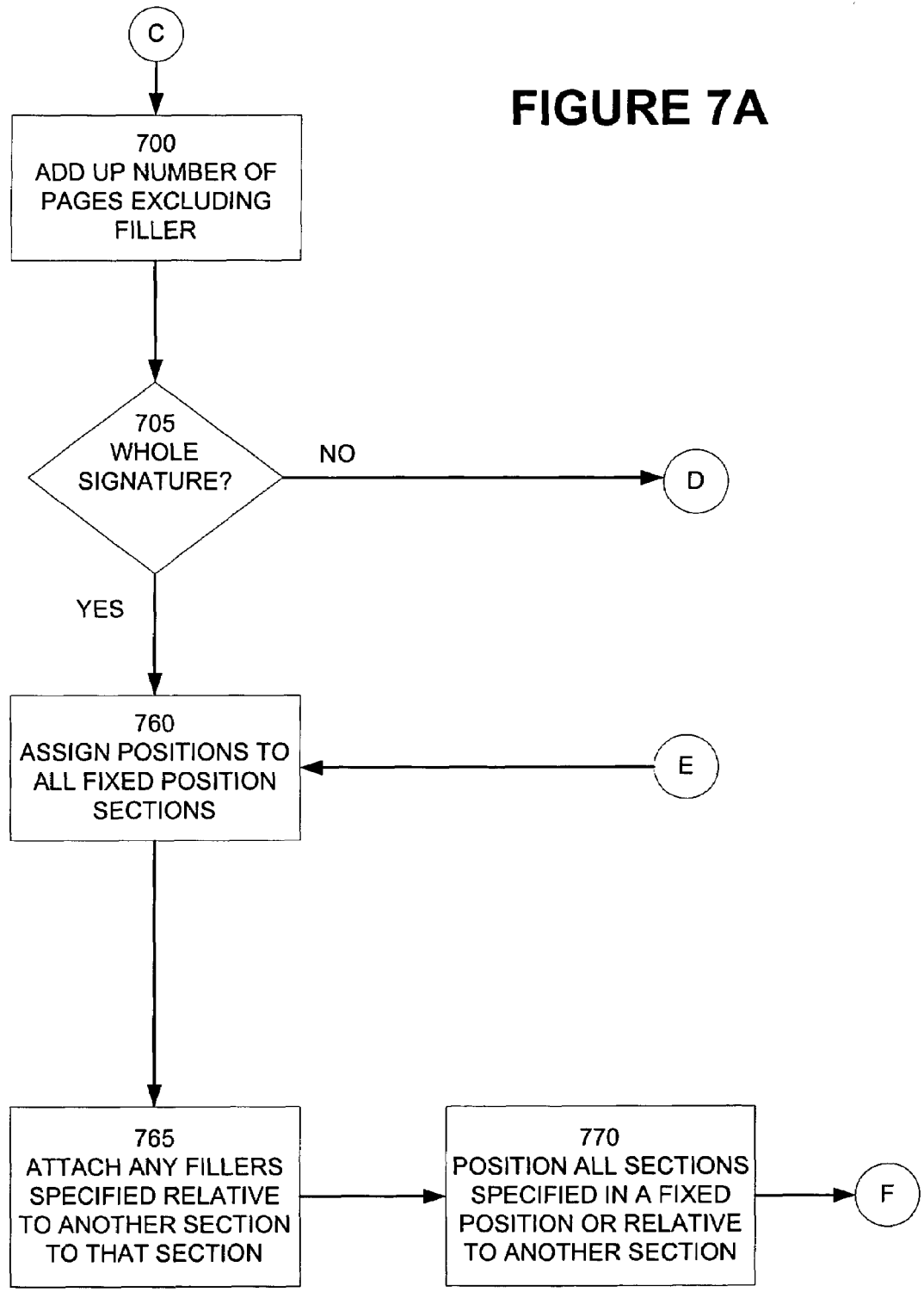
FIG. 7 illustrates an adjust-signature and position-product-section/page process according to an embodiment of the present invention.
Figure 7B:
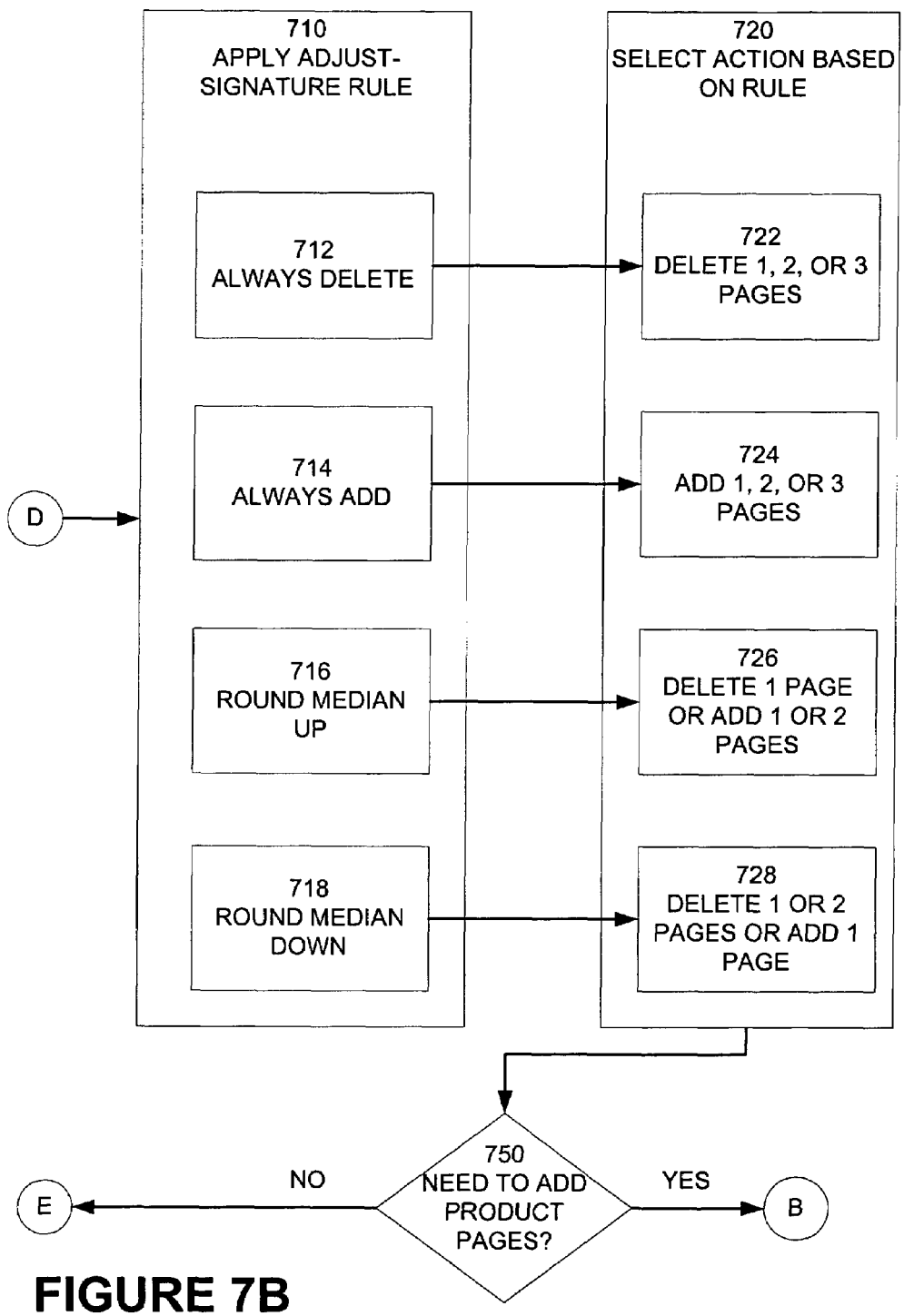

FIGS. 7A and 7B illustrate an adjust signature and position product section/page process according to an embodiment of the present invention. The adjust signature and position product section/page process is performed using the document assembler element 355 and the CCPS 300 (see FIG. 3). Referring to FIG. 7A, the number of pages of the customized catalogue (less filler) is determined 700. Typically, a catalogue destined for printing must be printed on both sides of paper twice the width of a single page, and stapled in the middle. In this example, the finished catalogue must have a total number of pages evenly divisible by four (referred to as "whole signatures" or an "even signature"). However, this is not meant as a limitation. As will be apparent to those skilled in the art, other signatures may be used without departing from the scope of the present invention. Using a set of signature rules, a determination is made whether the customized catalogue comprises whole signatures 705. If the signatures are whole, the process continues 750.

Referring to FIG. 7B, if the signature is not whole, a self-adjust rule 710 is applied. As illustrated in FIG. 7B, the self-adjust rule comprises one of an always delete rule 712, an always add rule 714, a round median up rule 716, and a round median down rule 718. The default self-adjust rule to be used is established by the catalogue retailer as a global rule, which may be overwritten for any specific campaign or section.

If the applicable self-adjust rule is "always delete" 712, the document assembler element 355 of the CCPS 300 (see FIG. 3) will reduce to size of as many sections as necessary by one page each to force the signature to a whole signature 722. In an embodiment, additional rules (not illustrated) are imposed wherein, for example and not as a limitation:

The section size reduction is initiated at the small-section end, one page from each as necessary, or As many pages as necessary are eliminated from the lowest relevancy (smallest) section(s)

A separate rule specifies what happens if following this rule reduces total size below the minimum catalogue size established for the customer's profile.

If the default self-adjust rule is "always add" 714, the document assembler element 355 of the CCPS 300 (see FIG. 3) will add as many pages as necessary from the pool of optional ads and fillers in the order set by the user to force the signature to a whole signature 724. A separate rule specifies what happens if following this rule increases the total size above the maximum catalogue size established for the customer's profile.

If the default self-adjust rule is "round pages up to fit" 716, the document assembler element 355 of the CCPS 300 (see FIG. 3) will add one or two pages (using the always add rule 714) or delete one page (using the always delete rule 712) 724. If the default self-adjust rule is "round median pages down to fit" 718, the document assembler element 355 of the CCPS 300 (see FIG. 3) will add one page (using the always add rule 714) or delete one or two pages (using the always delete rule 712) 728. As previously noted, the self-adjust rules illustrated in FIGS. 7A and 7B and discussed above are based on a whole signature of four pages. However, the invention is not so limited. As will be apparent to those skilled in the art, where different whole signature values may be specified, the values used in the self-adjust rules will be adjusted accordingly.

After applying the appropriate self-adjust rule, a determination is made if product pages are to be added 750. This determination depends on the self-adjust rule applied and the action required by the applied rules. If it is determined that product pages are to be added, the process returns to the product section/page creation process as illustrated in FIG. 6. The size of each section is increased by one page each until the number of pages to be added is achieved. The process restarts with the flow-products into product-sections process 620.

Referring again to FIG. 7A, once the signature has been made whole, all fixed position sections are assigned positions 760. The process is initiated by assigning tentative positions for all pages specified relative to the front and back covers, and then those specified in relation to the middle. Required fillers and ads specified relative to another section are attached to the specified section. For example, an ad for golf clubs is specified to run inside the golf section. If the golf section has three pages of products, a page is added to that section to include the ad and thereafter the system treats golf section as a four-page product section (assuming a whole signature of four pages).

All sections that are specified in a fixed position or relative to another section are positioned 770 according to the layout of the catalogue.

Figure 8:
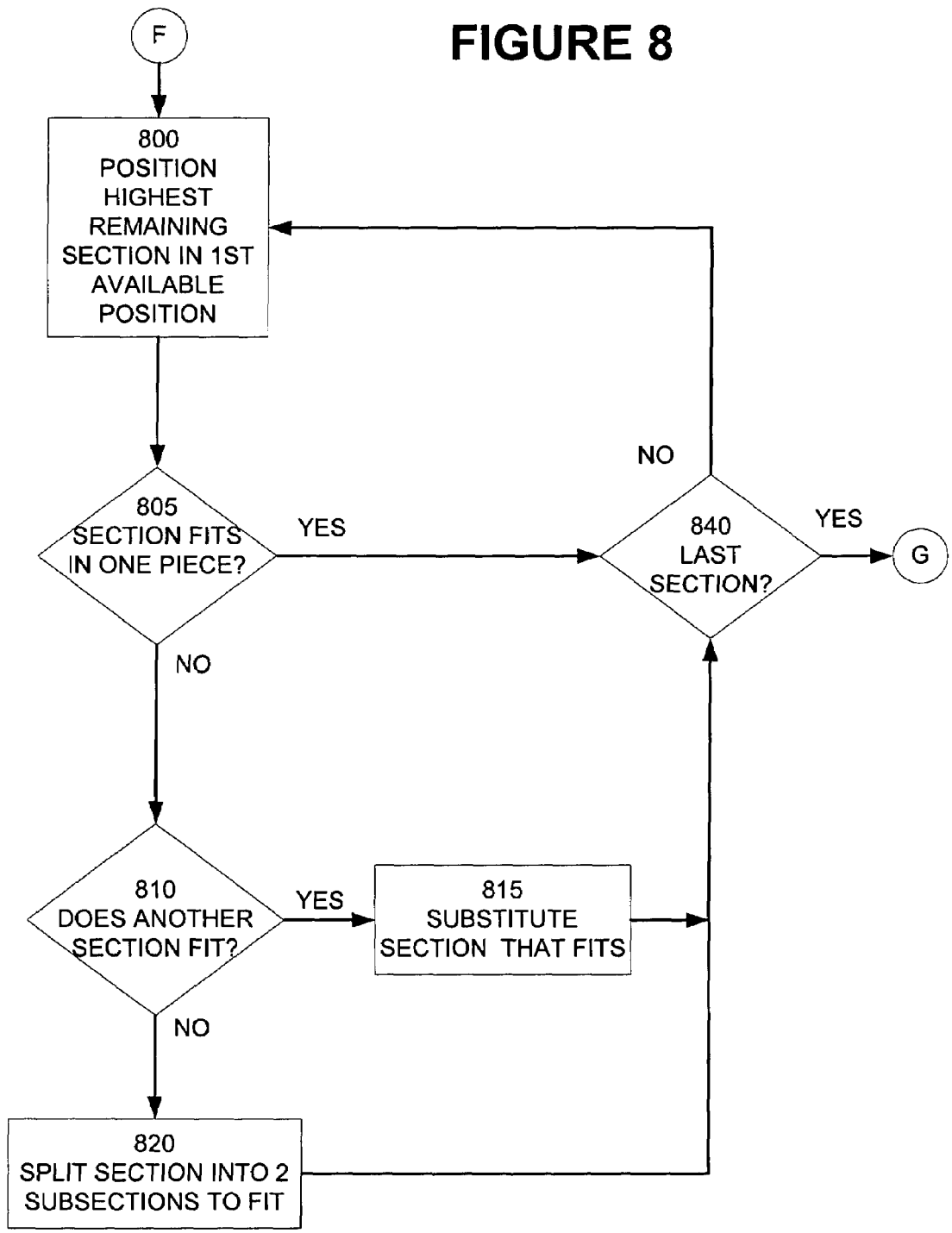
FIG. 8 illustrates a non-fixed-position page process according to an embodiment of the present invention.

FIG. 8 illustrates a position non-fixed page process according to an embodiment of the present invention. Each section is placed in the customized catalogue based on the priority (relevance) of the section in light of the page allocation rules set by the catalogue retailer. The section with the highest priority is placed in the first available position 800. A determination is made whether the section fits in one piece 805. If the section fits in one piece, the system proceeds to place the highest remaining section in the same way as the first, and so on until all sections are placed. If a section does not fit in one piece, a determination is made whether another section fits 810. If another section fits the space available, the section that fits is substituted for the section that does not 815. If there is no other section that fits, the section under consideration is split into two subsections 820. One subsection is then positioned in the first available space, and the remaining subsection is then promoted to the highest priority of remaining sections.

FIG. 9 illustrates a customized catalogue finishing process according to an embodiment of the present invention. The finishing process is performed using the document assembler element 355 of the CCPS 300 (see FIG. 3). The rules that the catalogue retailer specifies for sections may lead to difficulties. For example, there is nothing to prevent the catalogue retailer from setting every section to start on a left-hand page, and also to set the size of each section at an odd number. Unless there is an ad or filler page available to follow every section, holes would be left. And even if that solution is available, the total size of the customized catalogue would likely exceed the maximum number of pages set by the catalogue retailer. The rules for resolving these situations are set at the global level.

Referring to FIG. 9, a determination is made whether all left-page, right-page, spread, and filler-location rules met. If the rules are not met, the document assembler element 355 of the CCPS 300 (see FIG. 3) applies a repositioning process 905. The reposition process causes spreads to start on even pages 910, pages and sections with left/right problems to be swapped 915, and full-page fillers and ads to be moved so that such full pages do not face each other 920. If the rules are met, or following the reposition process, a specification file in PPML or other appropriate protocol is generated 930. The specification file is sent first to the print controller and thence, under control of printing plant personnel, to a printer and the customized catalogue is complete for that customer.

Figure 10B:
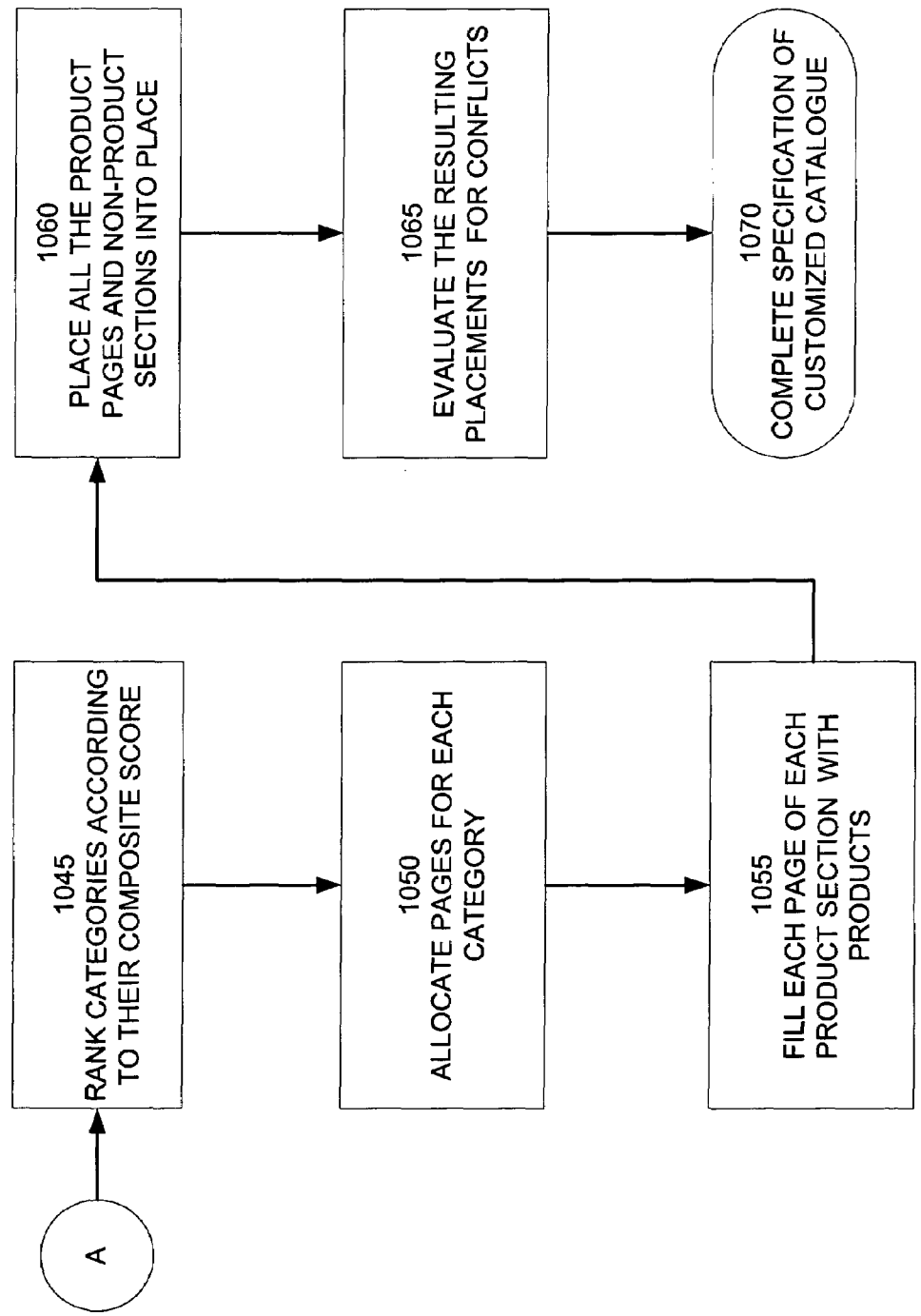

As noted in the discussion relating to FIG. 6, a customized catalogue reflects content that is directed at a targeted recipient. In the exemplary embodiment previously described, the customized catalogue is a catalogue, the content is directed to products, and the targeted recipient is a customer. FIGS. 10A and 10B illustrate a process by which the content of a customized catalogue is selected for a targeted recipient according to an embodiment of the present invention. The description that follows is directed to the exemplary embodiment of the customized catalogue, but the invention is not so limited. Referring to FIG. 10A, a catalogue retailer determines which products are candidates for promotion in the customized catalogue 1000 (that is, which products are candidate offerings). The reasons for such selection are usually a combination of the following:

Seasonal appeal

Special purchase

Cooperative advertising support from the manufacturer or wholesaler

Overstock situation

Unusually high profitability

Rounding out the selection in a catalogue

Though it is not necessary, catalogues are usually set up in much the same way, with similar products grouped together. The rules engine (see FIG. 1, 130) establishes a hierarchy comprising departments (or other "super categories"), categories, and subcategories to accomplish this internal organization. Products that are designated candidate offering are assigned to a group within the hierarchy 1005. In addition, the catalogue retailer may assign each candidate offering one or more assets 1010. By way of illustration and not as a limitation, the assets of a candidate offering comprise one or more graphic assets, one or more sets of descriptive copy, size range(s) and other price differentiators, ID number(s) and a price. In addition, the catalogue retailer or a rule determines whether to assign a candidate offering a positive or negative bonus factor (a "boost") 1015 that can be used to increase or decrease the offering's overall relevancy score and, therefore, the chances of getting the item into the customized catalogue for any customer. If a boost is to be assigned to one or more offerings, the catalogue retailer defines the parameters of the boost 1020.

After the assignment is completed or if no boost is to be assigned, the rules engine selects the first customer profile record 1025 and applies the catalogue rules to the customer profile for the particular campaign 1030. The rules for a campaign are established by the catalogue retailer. In this exemplary embodiment, the rules establish a bias toward repeat customers. However, this is not meant as a limitation. When a campaign is designed, a set of catalogue rules is established to determine which customers were to receive a customized catalogue and how many page that customer's customized catalogue should be. An illustrative table of catalogue rules for the exemplary customized catalogues is provided below:

| Prior Year's Sales | Pages in Catalog | Sections (categories) in Catalog | Average offerings per Page | Fractional Sections Permitted |
|---|---|---|---|---|
| >$20,000 | 72 | 10 | 2.5 | N |
| >10,000 | 60 | 8 | 3 | N |
| >$5,000 | 40 | 6 | 3.5 | Y |
| Others | 0 | N/A | N/A | N/A |

In addition, the catalogue retailer optionally establishes rules for each size catalogue. These optional catalogue rules determine which non-product pages need to, or may, be included in the catalogue. In this exemplary embodiment, non-product pages comprise covers, possible order forms, and similar content. Some non-product pages are composed and printed as part of the digital-printing process, while others may be pre-printed and inserted into the customized catalogue in the bindery stage. By way of illustration, and referring to the table of exemplary catalogue rules provided above, a customer who averaged $10,000 a month in purchases over the past year receives a customized catalogue that is 60 pages with eight sections, each featuring one category. In this example, the catalogue retailer specifies that six non-product pages must be included into each customized catalogue and that three additional pages are optional.

With 60 pages less six required non-product pages, the customized catalogue provided to this customer comprises 54 pages of products with about 54×3 or 162 offerings.

A determination is made (based on the customer profile and the catalogue rules) whether the customer is a targeted recipient of a customized catalogue 1032. If the customer is not a targeted recipient, the process for this customer ends 1034. If the customer is a targeted recipient, ranking rules are applied to the candidate offerings. A table of the highest and average score for each group with the hierarchy of the offering (e.g., category and sub-category) is constructed 1035 and a composite score generated 1040. In an embodiment of the present invention, the composite score comprises the average score of each selected offering within the group plus the highest score of any selected product within the group. However, this is not meant as a limitation. As will be apparent to those skilled in the art, other scoring conventions may be used without departing from the scope of the present invention.

As previously noted, while the catalogue retailer or client profile may establish different rules, in this exemplary embodiment the highest scoring category will get the most space in the customized catalogue, and the highest-scoring sub-category gets the top position and biggest display area within the category's section. By way of illustration, points are assigned to offerings represented in the purchase history or customer preferences than to those never purchased or preferred. The higher the sales of an item in the past, combined with any positive boost points, the higher the overall offering relevancy. The offering relevancy quantifies the relevance of each offering to the customer in question.

Referring to FIG. 10B the categories within the offering are ranked according to their composite score 1045. Pages are allocated for each category according to a user specified rule 1050, with proportionately fewer pages allocated to each successive category. Referring again to the exemplary customized catalogue having 54 pages of products, an exemplary page allocation table is provided below:

| Category | Pages |
|---|---|
| Coats | 11 |
| Suits | 10 |
| Blouses | 9 |
| Suits | 8 |
| Shoes | 6 |
| Boots | 4 |
| Summer Sportswear | 4 |
| Swimwear | 2 |
| TOTAL | 54 |

Each page of each product section is filled with products 1055, giving more space (fewer offerings per page) to high-scoring selected offerings, and less space to those with lower scores. In one embodiment of the invention, only the top set of selected offerings in each category is included in a section. For example, where the set of layout rules specifies an average of 3 offerings per section, in the coats section, only the top 11×3 or 33 selected offerings (more or less) will be included in the exemplary customized catalogue. These selected offerings become the catalogue offerings.

The product pages and non-product sections are placed according to the set of layout rules 1060. By way of illustration and not as a limitation, the product sections and the non-product sections of the exemplary customized catalogue are placed according to the following rules:

Place all sections that have a specified, fixed position relative to the beginning, end or middle of the customized catalogue.

Place all sections that have a specified position relative to a section with a fixed position.

Place all sections that have a specified position relative to any other section.

Place all other sections in order of their relative size (i.e. of their relative relevancy) or any other order specified by the catalogue retailer.

The resulting placements are evaluated for conflicts 1065. For example, a section may be specified to start on a two-page spread (i.e., two facing pages) but observing these rules causes it to fall onto a right-hand page instead of the left-hand. Additional conflict rules are provided to handle all of these conflicts.

When one or more pre-printed sections are included in the customized catalogue, the likelihood of conflicts within placements rises considerably. By way of illustration (and assuming a four page signature), if two-page inserts in a 60-page customized catalogue are specified to go after pages 10 and 20, inserts also go in before pages 41 and 51. This in effect creates not two but four fixed-position sections. This is true because each customized catalogue comprises a stack of pieces of paper, each with two pages printed on top and two more on the bottom, and with a fold and staples in the middle. Typically, all customized catalogue comprise large sheets printed with four, or a multiple of four pages, that when folded become "signatures," or sections of the customized catalogue. When all conflicts have been resolved according to the rules, the virtual customized catalogue has been completed and the final phase of production begins. A complete specification file of the customized catalogue is created 1070.

FIG. 10 illustrates a process based on a priori selection 'rules' for comparisons/matches of products with user profiles. The a priori selection rules are then articulated in a programmed computer process (instantiated rules). Initial integer sets (a priori) are programmed by humans/formula, and are static until conditions warrant otherwise. The final matching routines use these a priori integer sets to compare data and to make decisions. In another embodiment of the present invention, external data is used to modify one or more comparison integers to reflect the a posteriori data and subsequent analysis. The a posteriori data may impact the integer by modifying the value directly; causing a change in the calculation (selection rule) used to bring about the integer result; modifying individual customers' profiles to give boosts (plus or minus) to specific categories or subcategories; or modifying the indexed values used in the calculations in order to generate new indexed values. Users of the system have the ability to 'allow' comparisons to drive decisions, or to 'modify' results according to some human understanding not yet present in the system. User interfaces allow modifications of either customer profiles or rules, either in specific instances (i.e., the relative importance of a child's vision) for a group of customer profiles fond by the system to be similar in some way or in global terms (i.e., increase or reduce the relative importance of one or more categories or rules vis-à-vis other categories or rules in terms of the offering selection or offering ranking processes.) Every instance of such user or computer modification activity is logged, in detail, to allow a complex of 'fuzzy logic' analysis/statements which result in index modifications, and in further modifications of rules as warranted. In fact, the combination of records resultant from user activity, automated activities, and client feedback are all intricate parts of the a posteriori data file, and can be expected to improve effectiveness of future personalized catalogues for affected recipients.

Each new instance of a catalogue is 'rated' in terms of how successful it was over the useful life of the published piece, based on success parameters (e.g. sales). "Catalogues" mean fully customized catalogues, categories and subcategories within a customized catalogue, catalogue item, and items modified by additional promotional information. The success parameters, coupled with knowledge of the changes made in response to various a posteriori analyses, and refinements to business rules made manually, allow the rules to be refined and the effectiveness of the process to be improved. As discussed in the previous paragraph, the adjustment and modification process for both rules and customer profiles may in many cases be automated, using additional purchase history and preferences data combined with patterns discerned from purchase histories and preferences of similar customers to "learn" to improve the Rules Engine's performance and "judgment."

A system and method for creating a customized catalogue have now been illustrated. It will also be understood that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible By way of illustration and not as a limitation, the embodiments of the present invention may be used to produce a customized book, booklet, or other electronic or printed publication, self-publishing websites, commercial documents such as contracts and insurance policies, and many others type of output.

What is claimed is:

1. A method for producing a customized catalogue comprising pages for a catalogue retailer for delivery to a targeted recipient comprising:

acquiring targeted recipient data, wherein the targeted recipient data comprises historical transaction data specific to the targeted recipient, and wherein the historical transaction data relates to transactions between the targeted recipient and the catalogue retailer;

creating a targeted recipient profile from the targeted recipient data;

applying an offering rule to the targeted recipient profile to select a set of selected offerings from offerings stored in an offerings database;

applying a ranking rule to the set of selected offerings to create an ordered set of selected offerings, wherein the ordered set of selected offerings comprises a first selected offering and a second selected offering;

acquiring a first product asset associated with the first selected offering;

applying a page allocation rule to allocate a first space within a page of the customized catalogue for the first set of product assets associated with the first selected offering, wherein the page comprises a page space and wherein the page allocation rule does not utilize a page template;

acquiring a second product asset associated with the second selected offering;

determining a remaining space on the page, wherein the remaining space comprises the page space less than the first allocated space;

applying the page allocation rule to allocate a second space within the remaining space of the page of the customized catalogue for the second product asset associated with the second selected offering;

generating a customized catalogue specification file for the targeted recipient, wherein the customized catalogue specification comprises the first product asset, the second product asset, the first allocated space and the second allocated space; and printing the customized catalogue using the customized catalogue specification file.

2. The method for producing a customized catalogue for a catalogue retailer for delivery to a targeted recipient of claim 1, wherein the historical transaction data are selected from the group consisting of purchase history, returned-goods history, payment problems history, and customer correspondence.

3. The method for producing a customized catalogue for a catalogue retailer for delivery to a targeted recipient of claim 1, wherein the first and second product assets comprise attributes selected from the group consisting of text, graphics, and photographs.

4. The method for producing a customized catalogue for a catalogue retailer for delivery to a targeted recipient of claim 1, wherein the method further comprises:

applying a first layout rule to the first product asset to acquire a first layout attribute consistent with the first allocated space for the first selected offering; and applying a second layout rule to the second product asset to acquire a second layout attribute consistent with the second allocated space for the second selected offering.

5. The method for producing a customized catalogue for a catalogue retailer for delivery to a targeted recipient of claim 4, wherein the first and second layout attributes are selected from the group consisting of text fond, text size, graphic dimensions, photograph dimension, and photograph resolution.

6. The method for producing a customized catalogue for a catalogue retailer for delivery to a targeted recipient of claim 4, wherein the customized catalogue comprises a product section, and wherein applying the allocation rule to allocate the first and second space of a page of the product section comprises:

establishing in the product section a number of offerings per page; and allocating the first and second space of the page of the product section in accordance with the number of offerings per page.

7. The method for producing a customized catalogue for a catalogue retailer for delivery to a targeted recipient of claim 1, wherein the method further comprises:

determining a page count of the pages of the customized catalogue;

determining if the page count comprises a whole signature;

if the page count comprises the whole signature, then generating the customized catalogue specification; and if the page count does not comprise the whole signature, then applying a signature rule to force the page count to comprise the whole signature and then generating the customized catalogue specification.

8. The method for producing a customized catalogue for a catalogue retailer for delivery to a targeted recipient of claim 7, wherein the signature rule comprises deleting pages.

9. The method for producing a customized catalogue for a catalogue retailer for delivery to a targeted recipient of claim 7, wherein the signature rule comprises adding pages.

10. The method for producing a customized catalogue for a catalogue retailer for delivery to a targeted recipient of claim 9, wherein adding pages comprises adding filler pages.

11. The method for producing a customized catalogue for a catalogue retailer for delivery to a targeted recipient of claim 1, wherein the method further comprises applying a boost factor to an offering stored in the offerings database prior to applying the ranking rule.

12. The method for producing a customized catalogue for a catalogue retailer for delivery to a targeted recipient of claim 1, wherein the targeted recipient data further comprises customer demographic information selected from the group consisting of customer name, customer address, customer preference, and household makeup.

13. The method for producing a customized catalogue for a catalogue retailer for delivery to a targeted recipient of claim 1 further comprising:

assigning the targeted recipient to a targeted recipient group using the targeted recipient profile of the targeted recipient and a member profile of each member of the targeted recipient group;

imputing attributes of the targeted recipient group to the targeted recipient profile of the targeted recipient to create a revised targeted recipient profile for the targeted recipient, wherein the revised targeted recipient profile becomes the targeted recipient profile.

14. A method for producing a customized catalogue comprising pages for a catalogue retailer for delivery to a targeted recipient comprising:

acquiring targeted recipient data, wherein the targeted recipient data comprises historical transaction data specific to the targeted recipient, and wherein the historical transaction data relates to transactions between the taraeted recipient and the catalogue retailer;

Creating a targeted recipient profile from the targeted recipient data;

establishing a catalogue rule;

applying the catalogue rule to the targeted recipient profile to make a determination whether to product the customized catalogue for the targeted recipient;

applying the catalogue rule to the targeted recipient profile to make a determination of the number of pages in the targeted recipient's customized catalogue;

applying an offering rule to the targeted recipient profile to select a set of offerings from offerings stored in an offerings database;

applying a ranking rule to the set of selected offerings to create an ordered set of selected offerings, wherein the ordered set of selected offerings comprises a first selected offering and a second selected offering;

acquiring a first product asset associated with the first selected offering;

applying a page allocation rule to allocate a first space within a page of the customized catalogue for the first set of product assets associated with the first selected offering, wherein the page comprises a page space and wherein the page allocation rule does not utilize a page template;

acquiring a second product asset associated with the second selected offering;

determining a remaining space on the page, wherein the remaining space comprises the page space less than the first allocated space;

applying the page allocation rule to allocate a second space within the remaining space of the page of the customized catalogue for the second product asset associated with the second selected offering;

generating a customized catalogue specification file for the targeted recipient, wherein the customized catalogue specification comprises the first product asset, the second product asset, the first allocated space and the second allocated space; and printing the customized catalogue using the customized catalogue specification file.

15. The method for producing a customized catalogue for a catalogue retailer for delivery to a targeted recipient of claim 14, wherein the historical transaction data are selected from the group consisting of purchase history, returned-goods history, payment problems history, and customer correspondence.

16. The method for producing a customized catalogue for a catalogue retailer for delivery to a targeted recipient of claim 14, wherein the first and second product assets comprise attributes selected from the group consisting of text, graphics, and photographs.

17. The method for producing a customized catalogue for a catalogue retailer for delivery to a targeted recipient of claim 14, wherein the method further comprises:

applying a first layout rule to the first product asset to acquire a first layout attribute consistent with the first allocated space for the first selected offering; and applying a second layout rule to the second product asset to acquire a second layout attribute consistent with the second allocated space for the second selected offering.

18. The method for producing a customized catalogue for a catalogue retailer for delivery to a targeted recipient of claim 17, wherein the first and second layout attributes are selected from the group consisting of text fond, text size, graphic dimensions, photograph dimension, and photograph resolution.

19. The method for producing a customized catalogue comprising pages for a catalogue retailer for delivery to a targeted recipient of claim 14, wherein the method further comprises:

before generating the customized catalogue specification file for the targeted recipient, determining a page count of the pages of the customized catalogue;

determining if the page count comprises a whole signature;

if the page count comprises the whole signature, then generating the customized catalogue specification; and if the page count does not comprise the whole signature, then applying a signature rule to force the page count to comprise the whole signature and then generating the customized catalogue specification.

20. The method for producing a customized catalogue comprising pages for a catalogue retailer for delivery to a targeted recipient of claim 19, wherein the signature rule comprises deleting pages.

21. The method for producing a customized catalogue comprising pages for a catalogue retailer for delivery to a targeted recipient of claim 19, wherein the signature rule comprises adding pages.

22. The method for producing a customized catalogue comprising pages for a catalogue retailer for delivery to a targeted recipient of claim 21, wherein adding pages comprises adding filler pages.

23. The method for producing a customized catalogue comprising pages for a catalogue retailer for delivery to a targeted recipient of claim 14, wherein the method further comprises applying a boost factor to an offering stored in the offerings database prior to applying the ranking rule.

24. The method for producing a customized catalogue for a catalogue retailer for delivery to a targeted recipient of claim 14, wherein the targeted recipient data further comprises customer demographic information selected from the group consisting of customer name, customer address, customer preference, and household makeup.

25. The method for producing a customized catalogue for a catalogue retailer for delivery to a targeted recipient of claim 14 further comprising:

assigning the targeted recipient to a targeted recipient group using the targeted recipient profile of the targeted recipient and a member profile of each member of the targeted recipient group;

imputing attributes of the targeted recipient group to the targeted recipient profile of the targeted recipient to create a revised targeted recipient profile for the targeted recipient, wherein the revised targeted recipient profile becomes the targeted recipient profile.

26. A customized catalogue publication system for producing a customized catalogue comprising pages for a catalogue retailer for delivery to a targeted recipient comprising:

a targeted recipient record, wherein the targeted recipient record comprises historical transaction data relating to a targeted recipient, and wherein the historical transaction data relates to transactions between the targeted recipient and the catalogue retailer;

an offerings database, wherein the offerings database comprises offerings and wherein an offering is associated with a product assest;

a profiler, wherein the profiler is adapted to create a targeted recipient profile from the targeted recipient data; and a rules engine adapted for:

applying an offering rule to the targeted recipient profile to select a set of selected offerings from the offerings stored in an offerings database:

applying a ranking rule to the set of selected offerings to create an ordered set of selected offerings, wherein the ordered set of selected offerings comprises a first selected offering and a second selected offering;

acquiring a first product asset associated with the first selected offering;

applying a page allocation rule to allocate a first space within a page of the customized catalogue for the first set of product asset associated with the first selected offering, wherein the page comprises a page space and wherein the page allocation rule does not utilize a page template;

acquiring a second product asset associated with the second selected offering;

determining a remaining space on the page, wherein remaining space comprises the page space less than the first allocated space;

applying the page allocation rule to allocate a second space within the remaining space of the page of the customized catalogue for the second product asset associated with the second selected offering; and generating a customized catalogue specification file for the targeted recipient, wherein the customized catalogue specification comprises the first product asset, the second product asset, the first allocated space and the second allocated space; and a printing system adapted to receive the customized catalogue specification file and print the customized catalogue according to the customized catalogue specification file.

27. The customized catalogue publication system of claim 26, wherein the historical transaction data are selected from the group consisting of purchase history, returned-goods history, payment problems history, and customer correspondence.

28. The customized catalogue publication system of claim 26, wherein the printing system further comprises:
a printer; and
a file translation system adapted to convert the specification file to a format compatible with the printer.

29. The customized catalogue publication system of claim 28, wherein the printer is a web-fed printer.

30. The customized catalogue publication system of claim 28, wherein the printer is a sheet-fed printer.

31. The customized catalogue publication system of claim 28, wherein the printer is selected from the group consisting of a toner based printer, liquid ink based printer, and an ink-jet based printer.

32. The customized catalogue publication system of claim 26, wherein the first and second product assets comprise attributes are selected from the group consisting of text, graphics, and photographs.

33. The customized catalogue publication system of claim 26, wherein the rules engine is further adapted for:
applying a first layout rule to the first product asset to acquire a first layout attribute consistent with the first allocated space for the first selected offering; and
applying a second layout rule to the second product asset to acquire a second layout attribute consistent with the second allocated space for the second selected offering.

34. The customized catalogue publication system of claim 33, wherein the first and second layout attributes are selected from the group consisting of text font, text size, graphic dimensions, photograph dimension, and photograph resolution.

35. The customized catalogue publication system of claim 26, wherein the customized catalogue comprises a product section, wherein the product section comprises a page, and wherein the rules engine is further adapted for:
establishing in the product section a number of offerings per page; and
allocating the first and second space of the page in the product section in accordance with a number of offerings per page.

36. The customized catalogue publication system of claim 35, wherein the rules engine is further adapted for:

determining a page count of the pages of the customized catalogue;
determining if the page count comprises a whole signature;
if the page count comprises the whole signature, then generating the customized catalogue specification; and
if the page count does not comprise the whole signature, then applying a signature rule to force the page count to comprise the whole signature and then generating the customized catalogue specification.

37. The customized catalogue publication system of claim 35, wherein the signature rule comprises deleting pages.

38. The customized catalogue publication system of claim 35, wherein the signature rule comprises adding pages.

39. The customized catalogue publication system of claim 35, wherein the system further comprises filler pages and wherein the signature rule comprises adding filler pages.

40. The customized catalogue publication system of claim 26, wherein the rules engine is further adapted for applying a boost factor to an offering stored in the offerings database prior to applying the ranking rule.

41. The customized catalogue publication system of claim 26, wherein the profiler is further adapted for:
applying a catalogue rule to the targeted recipient profile to make a determination whether to produce a customized catalogue for the targeted recipient; and
applying the catalogue rule to the targeted recipient profile to make a determination of the number of pages in the targeted recipient's customized catalogue.

42. The customized catalogue publication system of claim 26, wherein the targeted recipient data further comprises customer demographic information selected from the group consisting of customer name, customer address, customer preference, and household makeup.

43. The customized catalogue publication system of claim 26, wherein the profiler is further adapted for:
assigning the targeted recipient to a targeted recipient group using the targeted recipient profile of the targeted recipient and a member profile of each member of the targeted recipient group;
imputing attributes of the targeted recipient group to the targeted recipient profile of the targeted recipient to create a revised targeted recipient profile for the targeted recipient, wherein the revised targeted recipient profile becomes the targeted recipient profile.

* * * * *